(12) United States Patent
Lee et al.

(10) Patent No.: US 7,597,978 B2
(45) Date of Patent: Oct. 6, 2009

(54) ANODE OF SOLID OXIDE FUEL CELL WITH NETWORKING STRUCTURE AND A METHOD OF ITS PREPARATION

(75) Inventors: Hae Weon Lee, Seoul (KR); Jong Ho Lee, Seoul (KR); Joo Sun Kim, Goyang-si (KR); Hue Sup Song, Seoul (KR); Haeng Jin Ko, Hwaseong-si (KR); Ki Chun Lee, Seongnam-si (KR)

(73) Assignees: Hyundai Motor Company, Seoul (KR); Korea Institute of Science and Technology, Seoul (KR)

( * ) Notice: Subject to any disclaimer, the term of this patent is extended or adjusted under 35 U.S.C. 154(b) by 809 days.

(21) Appl. No.: 11/180,362

(22) Filed: Jul. 13, 2005

(65) Prior Publication Data
US 2007/0020508 A1    Jan. 25, 2007

(30) Foreign Application Priority Data
Jul. 13, 2004    (KR) .................... 10-2004-0054412

(51) Int. Cl.
H01M 4/86    (2006.01)

(52) U.S. Cl. ................ 429/30; 429/45; 264/618; 428/403

(58) Field of Classification Search .............. 429/30, 429/45; 264/618; 428/403
See application file for complete search history.

(56) References Cited

U.S. PATENT DOCUMENTS

| | | | |
|---|---|---|---|
| 2001/0027257 A1* | 10/2001 | Marion | 564/422 |
| 2002/0192534 A1* | 12/2002 | Ipponmatsu et al. | 429/40 |
| 2003/0027033 A1* | 2/2003 | Seabaugh et al. | 429/40 |

* cited by examiner

*Primary Examiner*—Jane Rhee
(74) *Attorney, Agent, or Firm*—Morgan, Lewis & Bockius LLP

(57) ABSTRACT

The present invention relates to ceramic-NiO composite powders which can be used to form ceramic-NiO composite body anodes. These anodes possess an interpenetrating network structure and can be used in solid oxide fuel cell (SOFC) by The present invention also describes methods of preparing these powder, anodes and fuel cells.

3 Claims, 4 Drawing Sheets

ANODE OF SOLID OXIDE FUEL CELL WITH NETWORKING STRUCTURE AND A METHOD OF ITS PREPARATION

CROSS REFERENCE TO RELATED APPLICATIONS

This application is based on, and claims priority from Korean Application No. 10-2002-0054412, filed on Jul. 13, 2004, the disclosure of which is hereby incorporated by reference.

BACKGROUND OF THE INVENTION

1. Field of the Invention

The present invention relates to ceramic-NiO composite powders which can be used to form ceramic-NiO composite body anodes. These anodes possess an interpenetrating network structure and can be used in solid oxide fuel cell (SOFC) by The present invention also describes methods of preparing these powder, anodes and fuel cells.

2. Background of the Related Art

A Fuel cell is a battery which can convert chemical energy generated by fuel oxidation into electrical energy. There are two major types of fuel cells: a low temperature type and a high temperature type. Since the hydrogen-oxygen fuel cell was introduced in the 1950s, the fuel cell has been continuously improved. Two of the most important fuel cell improvements involved high-temperature types: the molten carbonate fuel cell (MCFC) and the solid oxide fuel cell (SOFC hereinafter).

SOFC uses electrolytes having oxygen or hydrogen ion conductivity and is operated at among the highest temperature for fuel cells of its kind, about 700 to 1,000° C. Since all of its constituents are made of solid materials, it provides a rather simple structure compared to other types of fuel cells and also does not have problems connected with corrosion or loss/replenishment of electrolytes. In addition, SOFCs do not require the use of expensive nickel as a material but can directly use conventional hydrocarbon fuel without the use of an additional modifier. Furthermore, it enables combined heat generation using waste heat because it releases high temperature gases.

SOFCs in general consist of oxygen ion conductive electrolytes as well as cathodes and anodes which are located on opposite ends of the SOFC. The principle of operation of the SOFC is as follows. The oxygen ions generated at the cathode by the reduction of oxygen move through the electrolytes to the anode and react with hydrogen provided nearby, thus producing water. Electrons are generated at the anode while they are consumed at the cathode. Connection of the two electrodes generates electricity.

Anodes of SOFCs is usually made of nickel and ceramic. In a conventional method, nickel oxide ("NiO") powder and yttria-stabilized zirconia ("YSZ") powder were mixed, formed, sintered to form a sintered body and then heat treated under reduction atmosphere to produce Ni-YSZ cermet (KR 10-344936).

The above method is advantageous in that its process is simple. However, the interactions between YSZ powder and YSZ, NiO powder and NiO powder or YSZ powder and NiO, respectively, are different from each other, and thus even under the same conditions the two powders do not distribute concomitantly but usually coagulate together. When there is a particularly large difference in size between the two particles, isoagglutination occurs which results in a nonuniform microstructure at the anode.

The lack of powder uniformity influences the electrical conductivity, gas permeability, three-phased boundary reactivity, and other physical properties of the anode. The non-uniform microstructure of the anode also introduces procedural defects in the YSZ solid electrolyte layer and interfacial strength thereby deteriorating durability, mechanical strength and output characteristics of the manufactured unit cell battery.

More specifically, the lack of uniform crystal grain and pore size leads to denseness and coarseness in the Ni phase. This coarseness causes a change in volume during the heat cycle and redox reaction which subsequently leads to electrolyte damage. Further, the decrease in the size of the Ni, YSZ and pore three-phased boundary leads to a decrease in electrochemical activity and an increase in activation polarization resistance. This subsequently lowers the resulting output of the unit cell battery.

SUMMARY OF THE INVENTION

The inventors of the present invention, after extensive studies to resolve the problems in the art, discovered a ceramic-NiO composite powder. This ceramic-NiO composite powder can be produced by precipitating a Ni-comprising layer on the surface of ceramic powder particles via a process comprising steps of forming, sintering, and reduction. This ceramic-NiO composite powder can be used to create a ceramic-NiO composite body anode with an interpenetrating complex structure. In this interpenetrating complex structure, the size of the NiO-ceramic particles and the size of the pores become uniform. Ceramic-NiO composite body anodes greatly improve long term stability, heat cycle stability, redox stability and mechanical properties. These anodes can be used in solid oxide fuel cells ("SOFCs").

Therefore, in an embodiment of the present invention there is provided ceramic-NiO composite powder with a core-shell structure used in manufacturing a SOFC.

In another embodiment of the present invention there is provided a SOFC with an anode with an interpenetrating complex structure.

In a further embodiment of the present invention there is provided a method for manufacturing a ceramic-NiO composite powder with a core-shell structure.

In a still further embodiment of the present invention there is provided a method for manufacturing an anode of a SOFC with an interpenetrating complex structure.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF THE PREFERRED EMBODIMENTS

Figure 1:
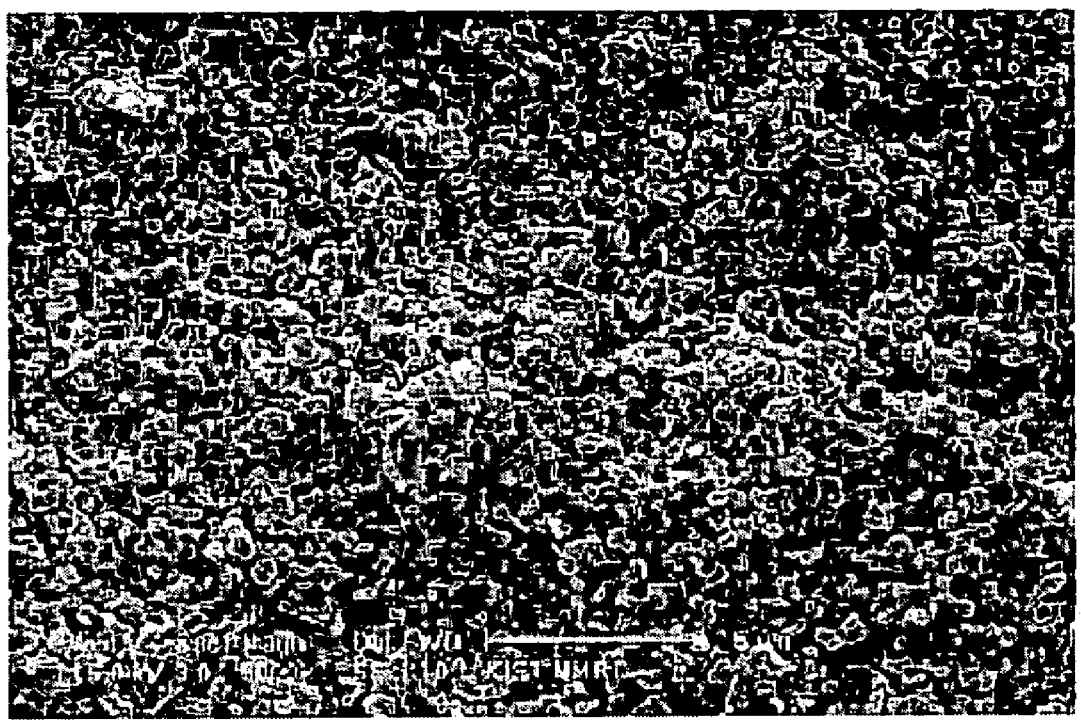
FIG. 1 shows a picture of a YSZ-NiO composite body anode of the present invention with an interpenetrating network structure taken with a scanning electron microscope (SEM)

Reference will now be made in detail to the preferred embodiments of the present invention as set forth hereunder.

In an embodiment, there is provided a ceramic-NiO composite powder with a core-shell structure. The core of this core-shell structure comprises ceramic and the shell comprises NiO. In an exemplary embodiment, the ceramic is Yttria-stabilized zirconia (YSZ). In another exemplary embodiment, the ceramic is gadolinium-doped ceria (GDC). In an exemplary embodiment, the ceramic is scandium-doped zirconium (ScZ). In an exemplary embodiment, the ceramic is lanthanium-strontium-gallium-magnesium (LSGM) oxide.

In another exemplary embodiment of the present invention, the ceramic-NiO composite powder is manufactured so that the weight ratio between ceramic and NiO is in the range of about 30-75:25-70 wt. %. In another exemplary embodiment, the weight ratio between ceramic and NiO is in the range of about 30:70 wt. % or about 35:65 wt. %, or about 40:60 wt. %, or about 45:55 wt. %, or about 50:50 wt. %, or about 55:45 wt. %, or about 60:40 wt. %, or about 65:35 wt. %, or about 70:30 wt. %, or about 75:25 wt. %.

In an exemplary embodiment, the ceramic-NiO composite powder is produced by a process wherein $Ni(OH)_2$ is precipitated on the surface of a ceramic powder particle and calcined, thus forming the ceramic-NiO composite powder. In another exemplary embodiment, the process further comprises forming said $Ni(OH)_2$ by mixing $Ni(NO_3)_2$ and $NH_4HCO_3$.

A method of manufacturing the ceramic-NiO composite powder of claim 1, said method comprising (a) milling a ceramic material, thus forming a ceramic powder; (b) forming a nickel-containing basic salt; (c) manufacturing said ceramic-$Ni(OH)_2$ composite powder by depositing said nickel-containing basic salt on the surface of said ceramic powder; (d) separating said ceramic-$Ni(OH)_2$ composite powder by filtration or ultracentrifugation; and (e) calcining the product of step (d) at 150-250° C. for about 90-150 min.

In another embodiment, there is provided an anode of a solid oxide fuel cell, wherein said anode has an interpenetrating network structure and comprises ceramic-NiO. In another embodiment, this anode comprises pores, and these pores have essentially the same size. In an exemplary embodiment, the ceramic is Yttria-stabilized zirconia (YSZ). In another exemplary embodiment, the ceramic is gadolinium-doped ceria (GDC). In an exemplary embodiment, the ceramic is scandium-doped zirconium (ScZ). In an exemplary embodiment, the ceramic is lanthanium-strontium-gallium-magnesium (LSGM) oxide.

In another embodiment, there is provided ceramic-NiO composite body anodes with an interpenetrating complex structure manufactured by using the above ceramic-NiO composite powder. In another embodiment, the invention provides a solid oxide fuel cell which comprises a ceramic-NiO composite body anode.

In a further embodiment, there is provided a method for manufacturing the above anodes.

More specifically, in preferred embodiments of the present invention, there are provided a method for manufacturing anodes of a solid oxide fuel cell with an interpenetrating network structure by using ceramic-NiO composite powder with a core-shell structure, wherein $Ni(OH)_2$ is precipitated on the surface of ceramic powder particles. When this ceramic-NiO composite powder is formed into a ceramic-NiO composite body anode for a fuel cell, the ceramic-NiO particles are uniform in size, as are the pores between the ceramic-NiO particles. This ceramic-NiO composite body anode has an interpenetrating network structure thereby providing greatly improved long term stability, heat cycle stability, redox stability and mechanical properties.

In still another preferred embodiment of the present invention, the ceramic-NiO composite body anodes of the solid oxide fuel cells are manufactured by
(a) forming the ceramic-NiO composite powder of the invention;
(b) manufacturing a ceramic-NiO complex sintered body by sintering at about 1150-1350° C.; and
(d) reducing the ceramic-NiO complex sintered body at 500-700° C. for about 3-6 hrs under a reduction atmosphere, thus manufacturing the ceramic-NiO composite body anode.

The processes of forming, sintering, and reduction in the course of manufacturing anodes of solid oxide fuel cells with an interpenetrating complex structure are described in greater detail hereunder.

In a step of manufacturing an anode formed body and a sintered body with a desired shape, size and thickness using a physically and chemically uniform ceramic-NiO complex with a core-shell structure, an anode with a thickness of about 0.2-1.5 mm is formed by means of a dry molding such as uniaxial compressed forming dry processing operation and hydrostatic molding or a wet molding such as tape casting and screen print. A ceramic-NiO complex sintered body is obtained by sintering the formed body at about 1150-1350° C. of atmosphere. Finally the ceramic-NiO complex sintered body is subjected to a temperature above 600° C. for about 3-6 hrs under a reduction atmosphere such as hydrogen, thereby obtaining porous ceramic-NiO anodes.

In particular, porosity and final microstructure of the resulting ceramic-NiO composite body anodes differ greatly depending on the filling density of the formed powder obtained in the course of molding process, and as a result, it is possible to control the overall properties of anodes such as electrical conductivity, gas permeability, electrochemical activity, and mechanical property.

Further, the size of pores can be adjusted according to the size of the ceramic, such as YSZ, a core component of the anode. By adjusting the ceramic size, the pore structure of the finally obtained porous ceramic-NiO composite body anodes can be easily controlled.

In the above YSZ-NiO anodes, when YSZ is replaced with gadolinium-doped ceria (GDC), scandium-doped zirconium (ScZ), or is lanthanium-strontium-gallium-magnesium (($(LaSr)GaMgO_3$), LSGM) oxide, it is possible to manufacture Ni-GDC anode, Ni-SDC anode, Ni-ScZ anode and Ni-LSGM anode with an interpenetrating complex structure, and these can be used as anodes of low temperature solid electrolyte fuel cell using GDC, SDC, ScZ or LGSM.

Further, when the composed phases of Ni, ScZ and pores form an interrelated continuous network, there occurs a drastic increase in strength fracture toughness of anodes. This enables the anodes to maintain mechanical endurance against external pressure being added in the course of high temperature operations as well as in the course of manufacture and transport.

Anodes with an interpenetrating complex structure have almost no shortcomings with regard to the face as compared to the conventional anodes because the distribution of the pore diameter is very narrow, and heat expansion behavior is under the control of the three-dimensionally continuous YSZ network, thereby having heat expansion coefficient similar to that of the YSZ.

Due to their uniform pore size, the ceramic-NiO composite body anodes have a relatively high mechanical strength as compared to that of the conventional anodes. This pore size uniformity prevents procedural defects from occurring and also provides mechanical reliance of unit cell battery even when the thickness of electrolytes is decreased.

In these ceramic-NiO composite body anodes the three-phased boundary consisting of Ni-ceramic (such as YSZ)-pores is large, thus enhancing the electrochemical activity of the anodes and thereby enabling the anodes to be operated at relatively low temperatures.

In particular, the size of coarse pores, which act as a size to determine critical defect due to the nature of an anode that shows brittle fracture behavior, serve as a major factor to determine mechanical strength. Therefore, the most desired anode is the one that has an ultrafine pore size, low porosity, can obtain a suitable gas permeability, high mechanical strength, low Ni fraction in an anode, thereby having thermo-mechanical properties similar to that of electrolyte while still capable of maintaining electrical conductivity.

The microstructure of these ultrafine anodes enables to greatly reduce procedural defects while reducing the thickness of the electrolyte layer to be formed on top of it. Further, it can maximize the electrochemical activities by increasing the area of three-phased boundary to the full. In addition, as the content of Ni in an anode decreases the difference in sintering behavior as compared to that of the electrolyte layer becomes decreases and this enables a simultaneous sintering thereby simplifying sintering process.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

EXAMPLES

Example 1

Manufacture of YSZ-NiO Composite Powder with a Core-Shell Structure

YSZ was pulverized and distributed via milling for an hour to make it into YSZ powder.

Then, $Ni(NO_3)_2$ solution was introduced to the above YSZ powder at the rate of 15 mL/min along with $NH_4HCO_3$ solution so that the molar ratio between $Ni(NO_3)_2$ solution and $NH_4HCO_3$ solution was 1:2. As a result, $Ni(OH)_2$ powder was generated by the reaction between the $Ni(NO_3)_2$ solution and $NH_4HCO_3$ solution, and it was precipitated on the surface of the YSZ powder. Here, the pH of the final slurry was maintained at 8.0. As $Ni(OH)_2$ powder was precipitated on the surface of the above YSZ powder, there was produced YSZ-$Ni(OH)_2$ composite powder wherein its core consists of YSZ and its shell consists of $Ni(OH)_2$.

The above YSZ-$Ni(OH)_2$ composite powder was washed/filtered 4 times in the presence of water and ethanol by using filtration or ultracentrifugation, and then dried. Then the dried YSZ-$Ni(OH)_2$ composite powder was calcined and formed YSZ-NiO (YSZ:NiO=35:65) composite powder.

Example 2

Manufacture of GDC-NiO Composite Powder with a Core-Shell Structure

GDC-NiO composite powder was manufactured as in Example 1 by replacing YSZ with GDC.

Example 3

Manufacture of YSZ-NiO Composite Body Anode Using YSZ-NiO Composite Powder with a Core-Shell Structure The YSZ-NiO (YSZ:NiO=35:65) composite powder manufactured in Example 1 was placed under the forming pressure of 50 MPa and molded by means of uniaxial compression which formed a YSZ-NiO composite molded body, and this molded body was sintered at 1300° C. under atmospheric pressure for 2 hours to produce a YSZ-NiO composite sintered body. The YSZ-NiO composite sintered body was heat treated at 600° C. under a reduction atmosphere for 3 hours, thus obtaining a YSZ-NiO composite body anode with a core-shell structure having a porosity of 25% and 50% (vol. %) Ni content.

Figure 3A:
FIGS. 3a and 3b show pictures of anodes manufactured by a conventional method taken by scanning electron microscope (SEM). These Figures show the pore structure of these anodes. Graphite was used as a pore-forming agent in FIG. 3a while a polymer with modifying capability was used as the pore-forming agent in FIG. 3b.
Figure 3B:
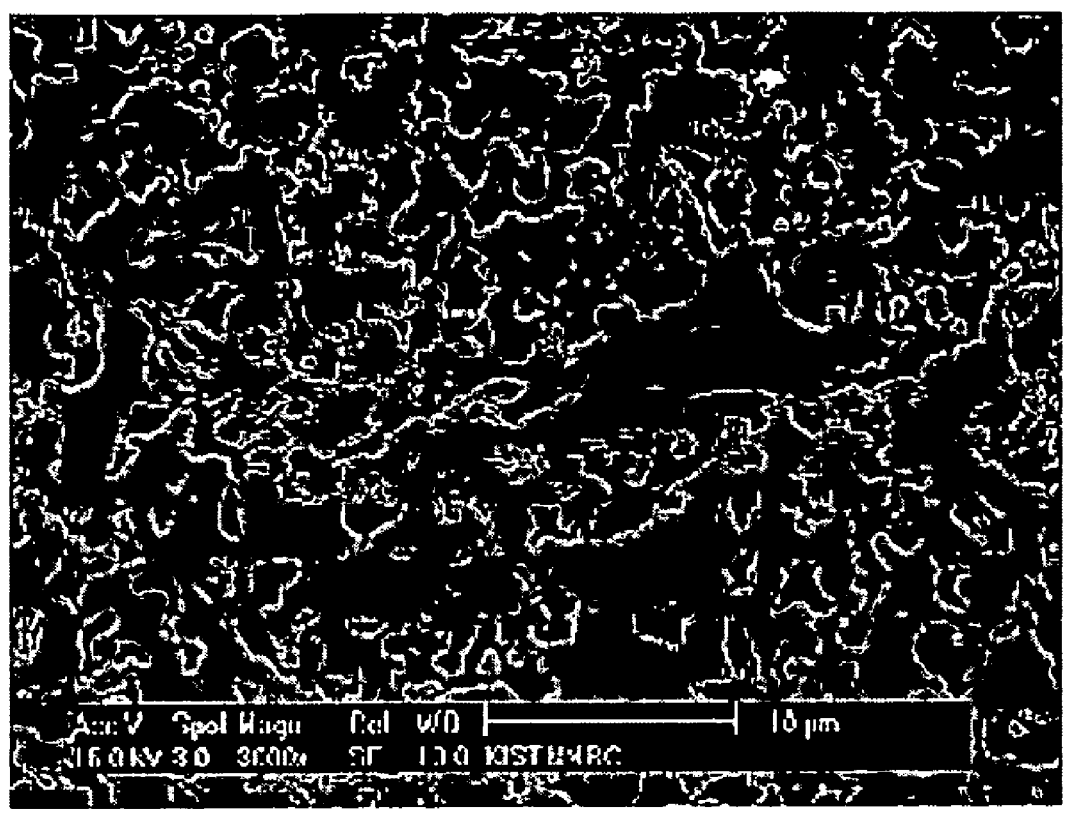

FIG. 1 shows a picture of a YSZ-NiO composite body anode of the present invention taken by scanning electron microscope (SEM). FIGS. 3a and 3b show pictures of the pore structure of anodes manufactured by a conventional method. Compared with FIGS. 3a and 3b, the YSZ-NiO composite body anode has a relatively uniform pore size and a lack of directionality for the coarse pores.

Examples of YSZ-NiO composite body anodes obtained by varying such conditions as YSZ-NiO content, forming pressure, sintering temperature and the like are shown in Table 1.

TABLE 1

| YSZ/NiO Content (wt. %) | Forming Pressure (MPa) | Sintering Temp (° C.) | Porosity (%) |
|---|---|---|---|
| 30/70 | 50 | 1350 | 58 |
|  | 100 | 1350 | 56 |
|  | 150 | 1350 | 53 |
|  | 200 | 1350 | 51 |
| 40/60 | 200 | 1200 | 45 |
|  | 200 | 1250 | 32 |
|  | 200 | 1300 | 25 |
|  | 200 | 1350 | 30 |

Example 4

Manufacture of GDC-NiO Composite Body Anode Using GDC-NiO Composite Powder with a Core-Shell Structure As in Example 3, an GDC-NiO composite body anode which can operate at low temperature can be manufactured by replacing YSZ with GDC.

Figure 2:
FIG. 2 shows a picture of a GDC-NiO composite body anode of the present invention with an interpenetrating network structure taken with a scanning electron microscope (SEM)

FIG. 2 shows a picture of an interpenetrating GDC-NiO composite body anode of the present invention taken by scanning electron microscope (SEM). Compared with FIGS. 3a and 3b, the GDC-NiO composite body anode has a relatively uniform pore size and a lack of directionality for the coarse pores.

Experimental Example

Evaluation of YSZ-NiO Composite Body Anode and GDC-NiO Composite Body Anode

The mechanical properties and electrical conductivity of YSZ-NiO (wt. % 35:65) and GDC-NiO (wt. % 35:65) composite body anodes manufactured in Example 3-4 of the present invention and those of the conventional ones were measured and compared in the following Table 2.

TABLE 2

| Classification | | Conventional Anodes | YSZ-NiO | GDC-NiO |
|---|---|---|---|---|
| Strength (Mpa) | Sintered Body | 131.3 | 241.7 | 146.2 |
| | Reduced body | 74.5 | 164.1 | 144.9 |
| Elastic Modulus (Gpa) | Sintered body | 83.4 | 193.1 | 183.5 |
| | Reduced body | 34.9 | 94.2 | 56.3 |
| Electrical Conductivity (S/cm) | 900° C. | 508 | 2716 | 2557 |
| | 800° C. | 539 | 2890 | 2712 |

As shown in Table 2 anodes manufactured by using an YSZ-NiO or GDC-NiO composite body anode with an interpenetrating structure have finer pore structures as compared to conventional anodes and thus have a suitable gas permeability, excellent mechanical strength and reduce procedural defects while still maintaining a thin electrolyte layer.

Further, YSZ-NiO or GDC-NiO composite body anodes have relatively low Ni fractions and excellent electrical conductivity while having excellent electrolyte layer and mechanical properties. Low temperature type SOFC can be manufactured by replacing a YSZ-NiO composite body anode with a GDC-NiO composite body anode.

INDUSTRIAL APPLICABILITY

As stated above, the ceramic-NiO composite body anodes of the invention have an interpenetrating network structure thereby providing greatly improved long term stability, heat cycle stability, redox stability and mechanical properties. These anodes can be used in SOFCs.

Further, the ceramic-NiO composite body anodes of the invention have superior electrical conductivity due to a relatively high Ni connectivity and also superior fracture strength due to relatively low content of coarse Ni phase, which often becomes the cause of fracture.

In addition, they can maintain mechanical endurance against external pressure being added in the course of high temperature operation as well as in the course of manufacture, transport, handling of stacks, due to the characteristics of brittle fracture behavior being shown in unit cell battery.

What is claimed is:

1. A method of manufacturing a ceramic-NiO composite powder with a core-shell structure, wherein said core comprises a ceramic and said shell comprises NiO, said method comprising:
   (a) milling a ceramic material, thus forming a ceramic powder;
   (b) forming a nickel-containing basic salt of $Ni(OH)_2$ by mixing $Ni(NO_3)_2$ and $NH_4HCO_3$;
   (c) manufacturing said ceramic-$Ni(OH)_2$ composite powder by depositing said nickel-containing basic salt on the surface of said ceramic powder;
   (d) separating said ceramic-$Ni(OH)_2$ composite powder by filtration or ultracentrifugation; and
   (e) calcining the product of step (d) at 150-250° C. for about 90-150 mm thus forming the ceramic-NiO composite powder.

2. The method according to claim 1, wherein said ceramic is a member selected from yttria-stabilized zirconia, gadolinium-doped ceria, scandium-doped zirconium and lanthanium-strontium-gallium-magnesium oxide.

3. The method according to claim 1, wherein the weight ratio of said ceramic to said NiO in said ceramic-NiO composite powder is about 30 to 75 wt. % ceramic to about 25 to 70 wt. % NiO.

* * * * *